(12) United States Patent
Uefune et al.

(10) Patent No.: US 7,929,247 B2
(45) Date of Patent: Apr. 19, 2011

(54) MAGNETIC DISK DRIVE AND MANUFACTURING METHOD THEREOF

(75) Inventors: Kouki Uefune, Kanagawa (JP); Takako Hayakawa, Kanagawa (JP); Akihiko Aoyagi, Kanagawa (JP); Takashi Kouno, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 875 days.

(21) Appl. No.: 11/904,059

(22) Filed: Sep. 25, 2007

(65) Prior Publication Data

US 2008/0088969 A1 Apr. 17, 2008

(30) Foreign Application Priority Data

Sep. 29, 2006 (JP) .................................. 2006-268092

(51) Int. Cl.
*G11B 33/14* (2006.01)
(52) U.S. Cl. .................................................... 360/97.02
(58) Field of Classification Search ............... 360/97.01, 360/97.02
See application file for complete search history.

(56) References Cited

U.S. PATENT DOCUMENTS

| 6,614,939 | B1 | 9/2003 | Yamauchi | |
|---|---|---|---|---|
| 7,123,440 | B2 * | 10/2006 | Albrecht et al. | 360/97.02 |
| 7,729,083 | B2 * | 6/2010 | Hatchett et al. | 360/97.02 |
| 2003/0179489 | A1 * | 9/2003 | Bernett et al. | 360/97.01 |
| 2005/0068666 | A1 | 3/2005 | Albrecht et al. | |
| 2005/0225893 | A1 * | 10/2005 | Nakamura | 360/97.01 |

FOREIGN PATENT DOCUMENTS

JP 08-161881 6/1996

* cited by examiner

*Primary Examiner* — Angel A. Castro (57) ABSTRACT

Embodiments of the present invention allow a cover of a magnetic disk drive to be temporarily joined to a base without widening a mounting space, and completely joined after a head disk assembly (HDA) inspection. According to one embodiment, a cover includes a metal plate, an adhesive, and a seal member. The adhesive has a surface wider than the metal plate and the seal member has a surface wider than the adhesive. A solder is coated or printed at an outer periphery of the seal member. A gasket is set at a flange of a base sidewall and an outer peripheral portion of the adhesive of the cover is affixed to an upper surface of the base sidewall to temporarily fix the cover. Low-density gas is injected in a casing interior and a functional inspection of the HDA is performed. After the inspection is finished, helium is injected again, and the casing is completely sealed by melting the solder of the seal member, and joining the seal member to a collar-shaped protrusion of the base sidewall by the solder.

12 Claims, 9 Drawing Sheets

MAGNETIC DISK DRIVE AND MANUFACTURING METHOD THEREOF

CROSS-REFERENCE TO RELATED APPLICATION

The instant nonprovisional patent application claims priority to Japanese Patent Application No. 2006-268092 filed Sep. 29, 2006 and which is incorporated by reference in its entirety herein for all purposes.

BACKGROUND OF THE INVENTION

Within modern magnetic disk drives (HDD), a disk is rotated at high speed and a Head Gimbal Assembly (HGA) is driven at high speed in response to demands for high capacity, high recording density and high-speed access. Accordingly, considerable air disturbance occurs, which causes vibration at the disk or the HGA. The air disturbance vibration will be a huge obstacle when positioning a head to data recorded in high density on the disk. The air disturbance occurs at random, and it is difficult to predict the magnitude or a cycle thereof, therefore, the rapid and accurate positioning will be complicated and difficult. In addition, the air disturbance will be a factor of noise, and also will be a factor impairing the quietness of the drive.

As a problem caused by action of air in the drive due to the high-speed rotation, there is the increase of power consumption in addition to the above. When the disk is rotated at high-speed, air in the vicinity of the disk is also involved and rotated. On the other hand, air which is distant from the disk is still, therefore, shearing force is generated therebetween, which will be a load to stop disk rotation. This is called as windage loss, which increases as the rotation speed becomes high. In order to rotate at a high speed against the windage loss, a motor requires large output, therefore, large electric power is necessary.

There was an idea in which air disturbance and windage loss are reduced by sealing gas which has lower density than air, instead of air, in a sealed magnetic disk drive, focusing attention on the fact that the disturbance and windage loss are relative to gas density in the drive.

As low-density gases, hydrogen, helium and the like can be used. Considering actual use, helium is most suitable, which is highly effective, stable and safe. In the magnetic disk drive in which helium gas is sealed therein, the above problems can be solved as well as rapid and accurate positioning control, low power consumption, and quietness can be realized.

However, helium has extremely small molecules and a large diffusion coefficient, therefore, there is a problem that a casing used for the normal magnetic disk drive has low-sealing performance and helium leaks easily during normal use.

Figure 9:
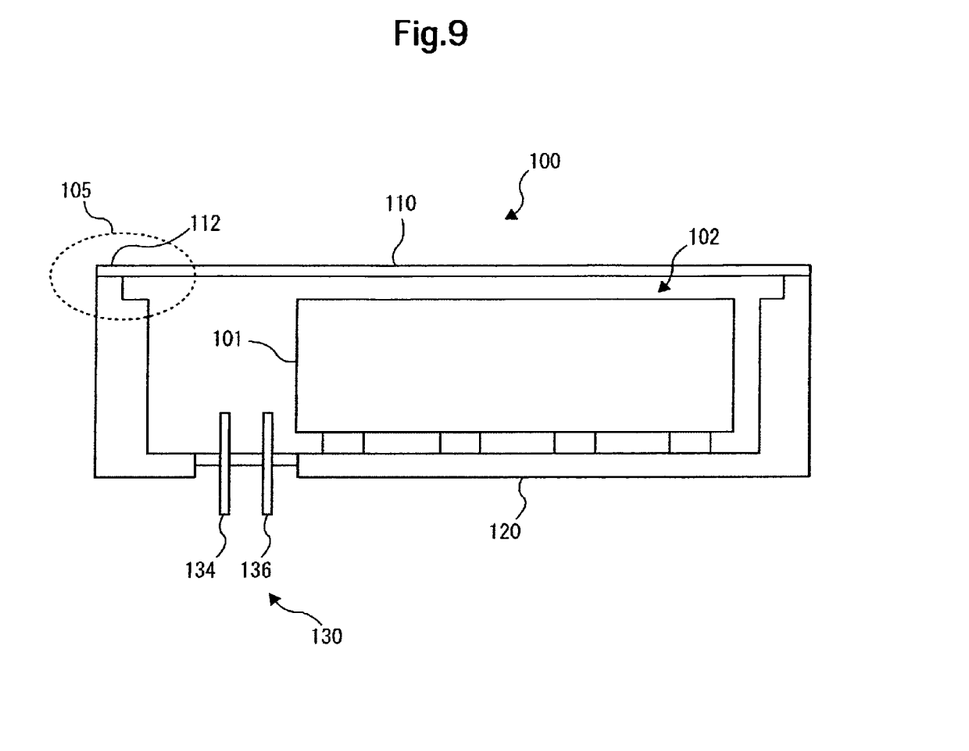
FIG. 9 is a cross-sectional view showing a casing structure of a conventional magnetic disk drive.

In order to allow low-density gas such as helium which leaks easily to be sealed, for example, a sealing structure disclosed in U.S. Patent Publication No. 2005-0068666 ("Patent Document 1") is proposed. FIG. 9 is a cross-sectional view showing a casing structure of a magnetic disk drive disclosed in Patent Document 1. A casing 100 includes a base 120 and a cover 110 jointed to upper portions of a sidewall of the base 120, and a head disk assembly (HDA) 101 is housed in a casing interior 102. In order to seal helium in the casing interior 102, the cover 110 is joined in an environment of helium gas, and at the same time of the joining, the casing interior 102 becomes a sealed magnetic disk drive which is filled with helium.

As a point in which the risk of leakage of helium gas in the casing is high, a joint portion 105 between the upper portion of the sidewall of the base 120 and the cover 110 is cited. In order to seal the joint portion 105 completely, the cover 110 is laser-welded on the upper portions of the sidewall of the base 120.

Concerning the base and the cover, in the light of durability, reliability and costs, a base molded by an aluminum die casting, and an aluminum cover formed by pressing or cutting are selected.

In the related arts, since the base and the cover are jointed by the laser welding, considerable welding area must be secured. Accordingly, it is required that the base sidewall of the magnetic disk drive is sufficiently high and wide. However, when aiming to miniaturize the magnetic disk drive, it is difficult to apply a structure in which the base sidewall is sufficiently high and wide. In the magnetic disk drive in which helium is sealed, a method is considered, for performing an inspection in a state of sealing helium and performing repair operation, in which an inner cover is attached temporarily on the base and helium gas is sealed in the casing interior until the inspection of the HDA is finished, and after the inspection is finished, an outer cover is joined by a welding and the like to perform complete sealing. However, when aiming to miniaturize the magnetic disk drive, it is difficult to apply the double cover structure as the above method because the height direction of the base sidewall becomes large.

BRIEF SUMMARY OF THE INVENTION

According to embodiments of the present invention, in a magnetic disk drive, a cover is temporarily joined to a base without widening a mounting space, and completely joined after a HDA inspection. According to the particular embodiment of FIG. 1, a cover 50 includes a metal plate 51, an adhesive 52, and a seal member 54. The adhesive 52 has a surface wider than the metal plate 51 and the seal member 54 has a surface wider than the adhesive 52. A solder 56 is coated or printed at an outer periphery of the seal member 54. A gasket 58 is set at a flange 14 of a base sidewall 13 and an outer peripheral portion of the adhesive 52 of the cover 50 is affixed to an upper surface of the base sidewall 13 to temporarily fix the cover 50. Low-density gas is injected in a casing interior and a functional inspection of the HDA is performed. After the inspection is finished, helium is injected again, and the casing is completely sealed by melting the solder 56 of the seal member 54, and joining the seal member 54 to a collar-shaped protrusion 15 of the base sidewall 13 by the solder.

DETAILED DESCRIPTION OF THE INVENTION

Embodiments of the invention relate to a magnetic disk drive. Particular embodiments relate to a sealed magnetic disk drive suitable for sealing low-density gas such as helium gas into the drive.

An object of embodiments of the invention is to join the base and cover without increasing the height and width of the base sidewall, as well as to enable the inspection process to be performed without taking the double structure of the cover, and to seal low-density gas such as helium gas sealed in the case interior for a long time.

A magnetic disk drive according to embodiments of the invention is a sealed magnetic disk drive including a base in which a head disk assembly is provided and a cover to be joined to the base, and low-density gas is sealed in a space between the base and cover which are joined, in which a sidewall of the base includes a flange inside, and the cover includes a metal plate, an adhesive having a surface wider than the metal plate, which adheres to an upper surface of the metal surface, a seal member having a surface wider than the adhesive, which adheres to the upper surface of the adhesive and a solder coated or printed at an outer periphery of the seal member, and in which the metal plate is pressed to the flange and the outer periphery of the seal member is joined to an upper surface of the sidewall of the base by the solder at the outside the adhesive by the adhesive of the cover being affixed to the upper surface of the sidewall of the base.

A magnetic disk drive according to embodiments of the invention is a sealed magnetic disk drive including a base in which a head disk assembly is provided and which has a sidewall, and a cover to be joined to the base and having a sidewall, and low-density gas is sealed in a space between the sidewalls of the base and cover which are joined, in which a belt-shape seal member including a belt-shape seal, an adhesive adhering to the belt-shape seal and a solder coated or printed on the belt-shape seal at a portion outside the adhesive is affixed to all around a side surface of a casing by the adhesive and joined by the solder.

A method of manufacturing a magnetic disk drive of according to embodiments of the invention includes the steps of mounting a head disk assembly in a base including a sidewall in which a flange is formed inside, and a collar-shaped protrusion is formed at an outside upper portion thereof, preparing a cover including a metal plate, an adhesive having a surface wider than the metal plate, which adheres to an upper surface of the metal plate, a seal member having a surface wider than the adhesive, which adheres to the upper surface of the adhesive and a solder coated or printed at an outer periphery of the seal member, pressing an outer periphery of the metal plate on a flange and forming a sealed casing by affixing the adhesive of the cover to the upper surface of the sidewall of the base, sealing low-density gas into the sealed casing and inspecting the head disk assembly, and melting the solder and joining the seal member to a collar-shaped protrusion of the base after the inspection is finished.

A method of manufacturing a magnetic disk drive according to embodiments of the invention includes the steps of mounting a head disk assembly in a base having a sidewall, preparing a belt-shape seal member including a belt-shape seal, an adhesive adhering to the belt-shape seal and a solder coated or printed at a portion outside the adhesive of the belt-shape seal, forming a casing by overlapping the sidewall of the base on a sidewall of a cover, affixing the adhesive of the belt-shape seal member to all around of a side surface of the casing to be sealed, sealing low-density gas into the sealed casing and inspecting the head disk assembly and melting the solder and joining the belt-shape seal to the side surface of the casing by the solder after the inspection.

According to embodiments of the invention, the base and the cover can be joined together without heightening and widening the base sidewall, as well as the inspection process can be performed without taking a double cover structure, as a result, low-density gas such as helium gas sealed in the casing interior can be sealed for a long time.

Figure 8:
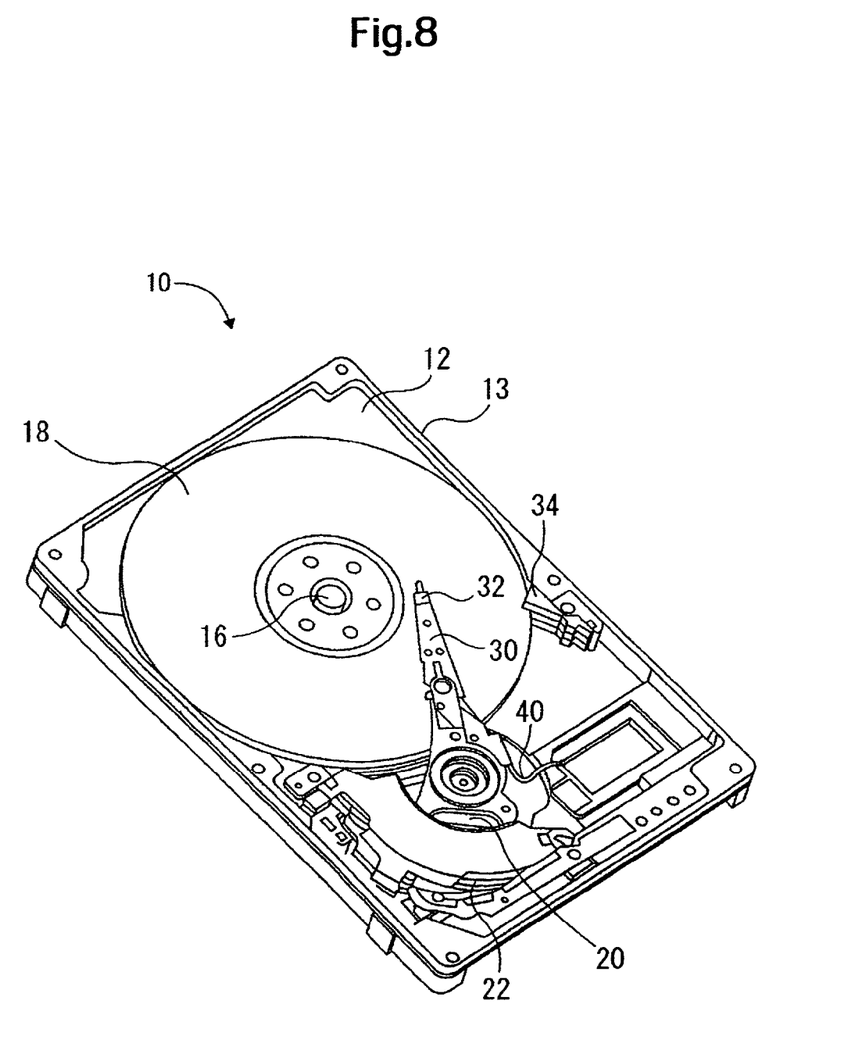
FIG. 8 is an upper surface view showing a basic structure of a magnetic disk drive according to an embodiment of the invention.

First, a basic structure of a magnetic disk drive according to an embodiment of the invention will be explained with reference to FIG. 8. FIG. 8 is a perspective view of a state in which a cover is removed. A magnetic disk drive 10 includes a base 12 having a sidewall 13 therearound, and the following respective elements forming a recording/reproducing unit are mounted on the base 12. A spindle motor 16 is fixed at the bottom of the base 12 and a magnetic disk 18 as an information recording/reproducing medium is attached to the spindle motor 16 to be rotated and driven by the spindle motor 16. The base 12 is also provided with an actuator assembly 20 including a voice coil motor 22, which rotates and drives a head gimbal assembly (hereinafter, abbreviated as HGA) 30 attached to the actuator assembly 20.

At a tip end portion of the HGA 30, a magnetic head 32 for performing recording/reproducing of information with respect to the magnetic disk 18 is provided through a slider having an air bearing surface (ABS) with respect to the magnetic disk 18. The HGA 30 is rotated in a radius direction of the magnetic disk 18 and the magnetic head 32 is positioned on a truck of the magnetic disk 18 to perform recording and reproducing. In addition, a ramp mechanism 34 is provided at the base 12, which retracts the magnetic head 32 outside the magnetic disk 18 when recording/reproducing operation is not performed or when the drive is stopped. And further, a FPC assembly 40 is provided, which connects the magnetic head 32 and the respective motors to a circuit substrate for driving and controlling them, which is provided outside the casing. According to the connection, information recorded or reproduced by the magnetic head 32, and electric power for driving respective motors are transmitted. A structure formed by the spindle motor 16, the magnetic disk 18, the actuator assembly 20 and the HGA 30 in the casing is called as a head disk assembly (hereinafter, abbreviated as HDA).

Figure 1:
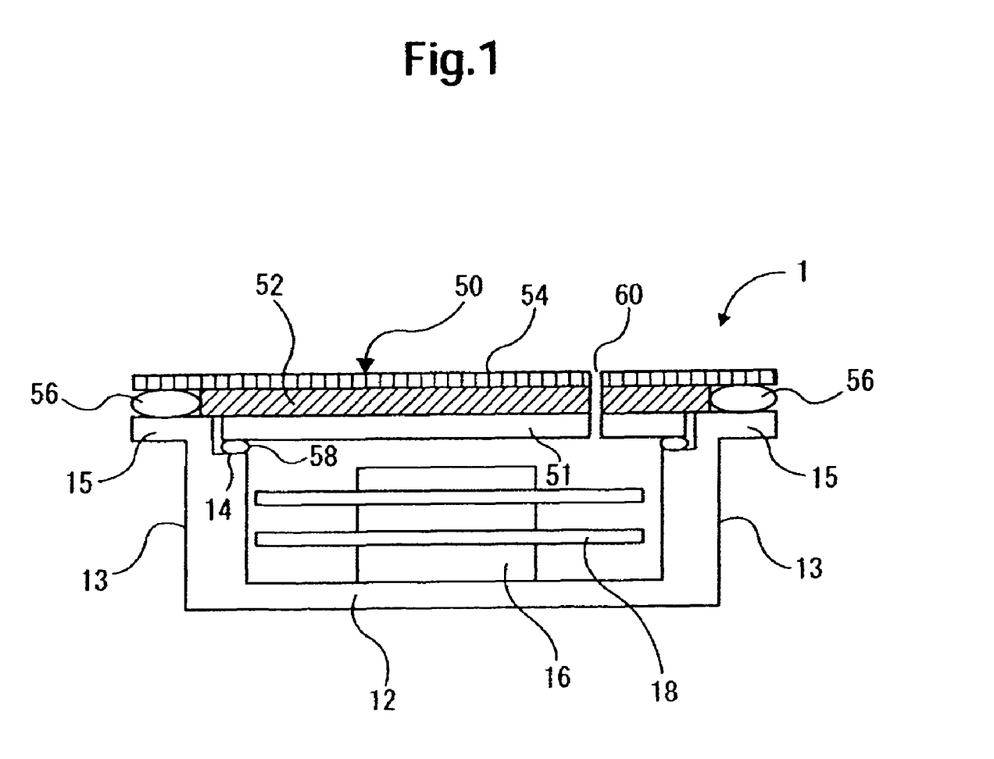
FIG. 1 is a cross-sectional schematic view of a magnetic disk drive according to a first embodiment of the invention, and a cross-sectional view taken along A-A line of FIG. 2.
Figure 2:
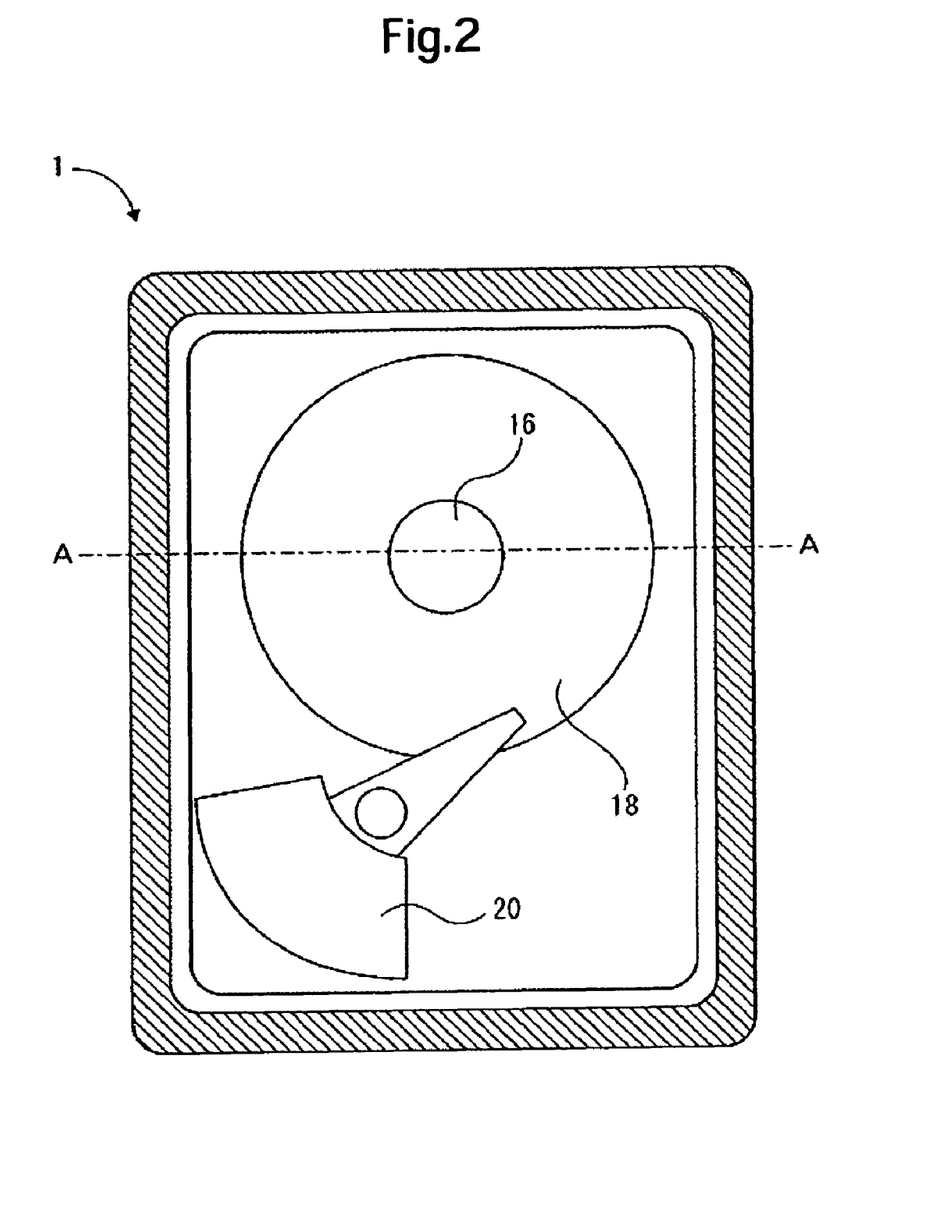
FIG. 2 is a schematic view of an upper surface of the magnetic disk drive according to the first embodiment, which is shown by seeing through the inside.

Embodiments of the invention have a characteristic in a structure for sealing low-density gas such as helium gas sealed in the casing interior for a long time, namely, at the time of the inspection of the drive and after the inspection is finished in the above magnetic disk drive. Hereinafter, a magnetic disk drive 1 according to a first embodiment of the invention will be explained with reference to FIG. 1 to FIG. 3. FIG. 2 is a schematic view of an upper surface of the magnetic disk drive 1 over which the cover is fitted, which is shown in perspective so that the spindle motor 16, the magnetic disk 18 and the actuator assembly 20 forming the HDA in the casing interior can be seen. FIG. 1 is a cross-sectional view taken along A-A line of FIG. 2. In FIG. 1 and FIG. 2, the HAD is mounted on the base 12 having the sidewall 13, and a cover 50 is fitted on the sidewall 13 of the base 12 to form a sealed casing. The cover 50 includes a metal plate 51, a seal member 54 and an adhesive 52 coated on the seal member 54 and affixed to the metal plate 51. The adhesive 52 has a surface wider than the metal plate 51, and the seal member 54 has a surface wider than the adhesive 52. At an outer periphery of the seal member 54, a solder 56 is coated or printed.

Next, a method of fitting the cover 50 on the base sidewall 13 after the HDA is mounted on the base 12 will be explained with reference to FIG. 1. A gasket (seal member) 58 is set at a flange 14 of the base sidewall 13, and a peripheral portion of the adhesive 52 of the cover 50 is affixed to the upper surface of the base sidewall 13 to fix the cover 50 temporarily. At this time, a peripheral portion of the metal plate 51 presses the gasket 58 set on the flange 14 to form the sealed casing. An injecting hole 60 is provided at the cover 50, and low-density gas is injected in the casing interior from the injection hole 60 to inspect the function of the HDA. It is preferable to use helium, hydrogen or the like as low-density gas, particularly preferable to use helium. The sealing by the basket 58 is not perfect sealing, however, it can maintain the sealed state for approximately several days during which the HDA is inspected. In the case that the drive passes the inspection process, helium is injected again, the solder 56 coated or printed at the outer periphery of the seal member 54 is melted and the outer periphery of the seal member 54 is joined by solder to a collar-shaped protrusion 15 formed at an outer peripheral side of the base sidewall 13 to seal the casing completely. In the case that the drive does not pass the inspection process, the adhesive 52 is peeled off, and a component judged as failure is exchanged and assembled again. After helium is injected from the injection hole 60, sealing is affixed from outside, thereby preventing the helium injected in the casing interior from leaking outside the casing from the injection hole 60.

Figure 3:
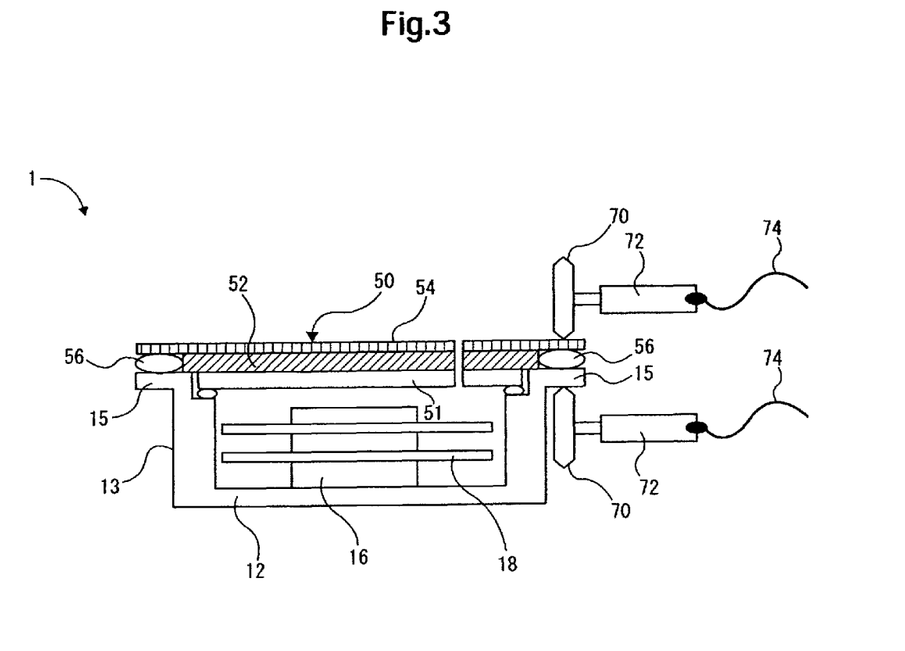
FIG. 3 is a view for explaining a method of soldering a cover to a base.

Next, a method of soldering the seal member 54 on the collar-shaped protrusion 15 of the base 12 will be explained with reference to FIG. 3. A heating roller 70 is pressed on a surface of a lower side of the collar-shaped protrusion 15 of the base sidewall 13 and an upper surface of the outer periphery of the seal member 54 in the magnetic disk drive 1, then, the heating roller 70 is made to circle around the casing while being rotated, so as to sandwich the solder 56 coated or printed on the seal member 54. The heating roller 70 is supported by a rotation support member 72, which generates heat by electric current supplied through a lead wire 74 and melts the solder 56 to join the seal member 54 to the collar-shaped protrusion 15 of the base sidewall 13 by solder.

As described above, according to the first embodiment, the cover can be temporarily joined to the base by the adhesive without taking the double cover structure. In addition, the base and the cover can be joined together by solder provided at the seal member without heating the base side wall partially, and without heightening and widening the base sidewall. Therefore, sealing performance of the joint between the base and the cover can be secured.

Figure 4:
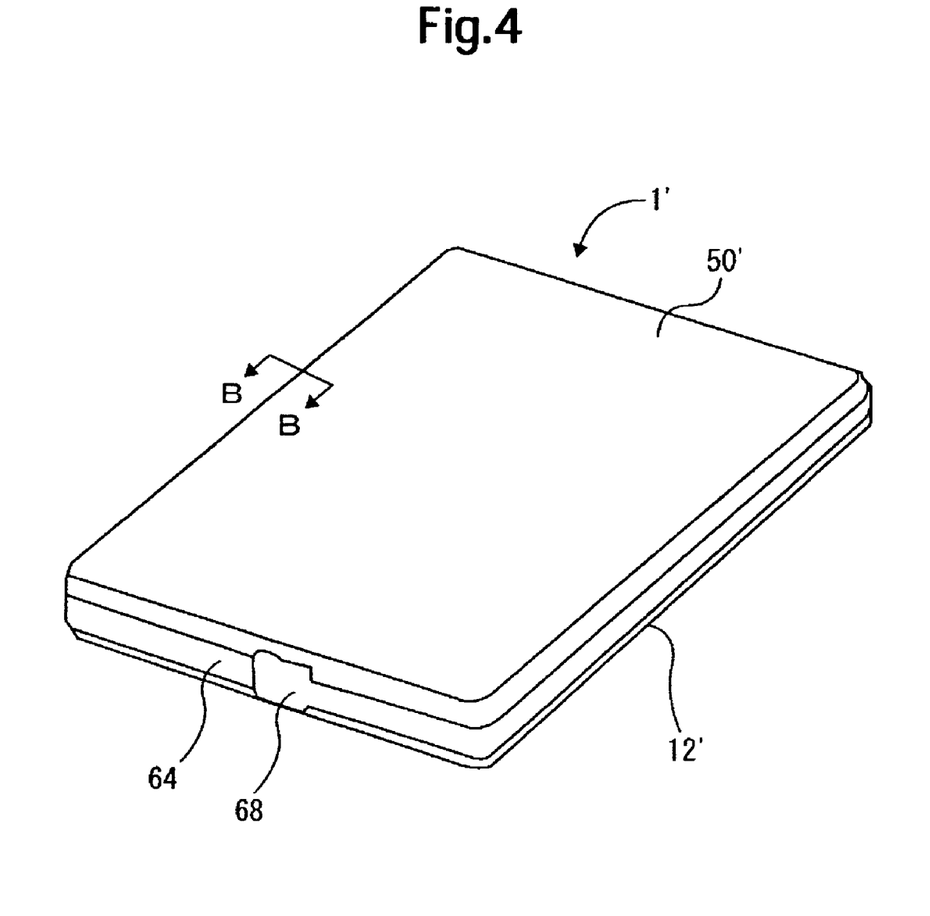
FIG. 4 is an outline view of a magnetic disk drive according to a second embodiment of the invention.
Figure 5:
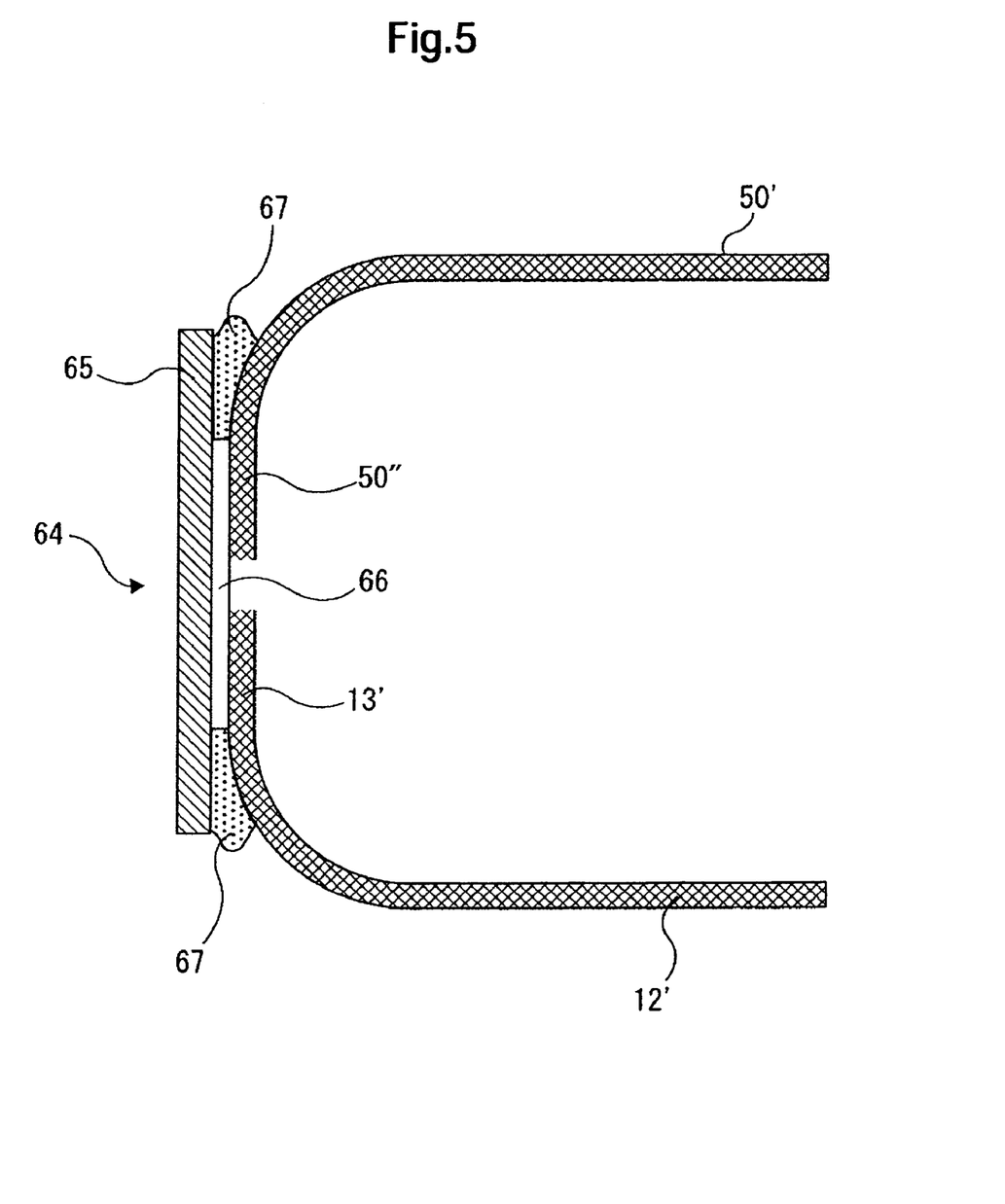
FIG. 5 is a cross-sectional view taking along B-B line of FIG. 4.

Next, a magnetic disk device 1' according to a second embodiment of the invention will be explained with reference to FIG. 4 to FIG. 7. FIG. 4 is an outline view of the magnetic disk drive 1' in which an overlap portion of a base 12' and the cover 50' is sealed along the circumference by a belt-shape seal member 64. The structure in the magnetic disk drive is the same as the first embodiment. FIG. 5 shows a cross-section taken along B-B line, and the base 12' and the cover 50' have a box-shape respectively, and the HDA is mounted on the base 12'. The casing is formed by overlapping a sidewall 50" of the cover 50' on a sidewall 13' of the base 12'. In the embodiment, the height of the sidewall 13' of the base 12' is lower than the example of the first embodiment and the cover 50' has the sidewall 50" instead. The height of the casing in a state in which the sidewall 50" of the cover 50' is overlapped on the sidewall 13' of the base 12' is the same as the first embodiment.

Figure 6:
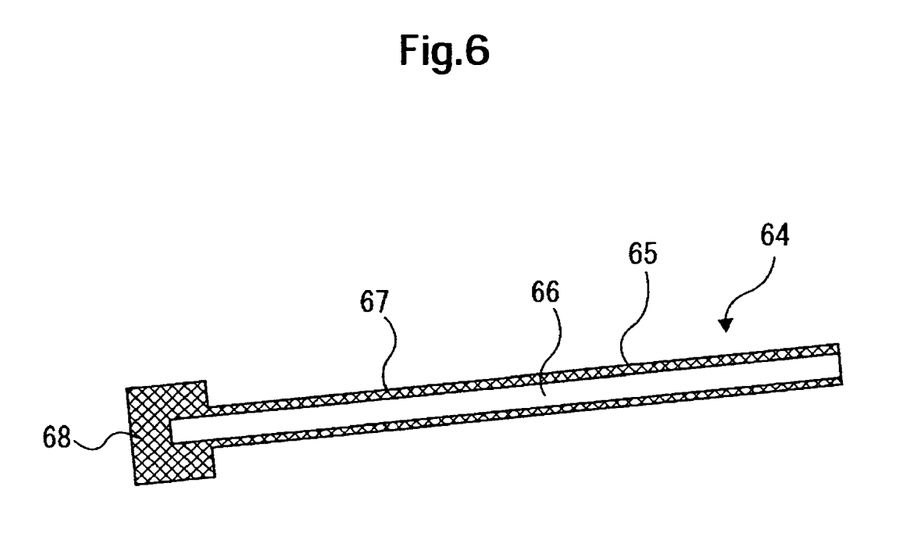
FIG. 6 is a developed view of a belt-shape seal member used in the second embodiment.

The belt-shape seal member 64 is shown by being developed in FIG. 6. The belt-shape seal member 64 includes a belt-shape seal 65, an adhesive tape 66, a solder 67 coated or printed on the belt-shape seal portion 65 at a portion outside the adhesive tape 66 and an end portion 68.

As shown in FIG. 4 and FIG. 5, after assembling the magnetic disk drive 1', the belt-shape seal member 64 is affixed around the base 12' and the cover 50', and the overlapped portion of the base 12' and the cover 50' is temporarily joined by the adhesive tape 66. After the temporal joining, helium is injected in the casing interior and the HDA is inspected. In the case that the drive passes the inspection, the solder 67 is heated to solder the belt-shape seal 65 at a side surface of the base 12' and the cover 50'. Then, the end portion 68 of the belt-shape seal member 64 is overlapped at a tip end portion to be soldered.

Figure 7:
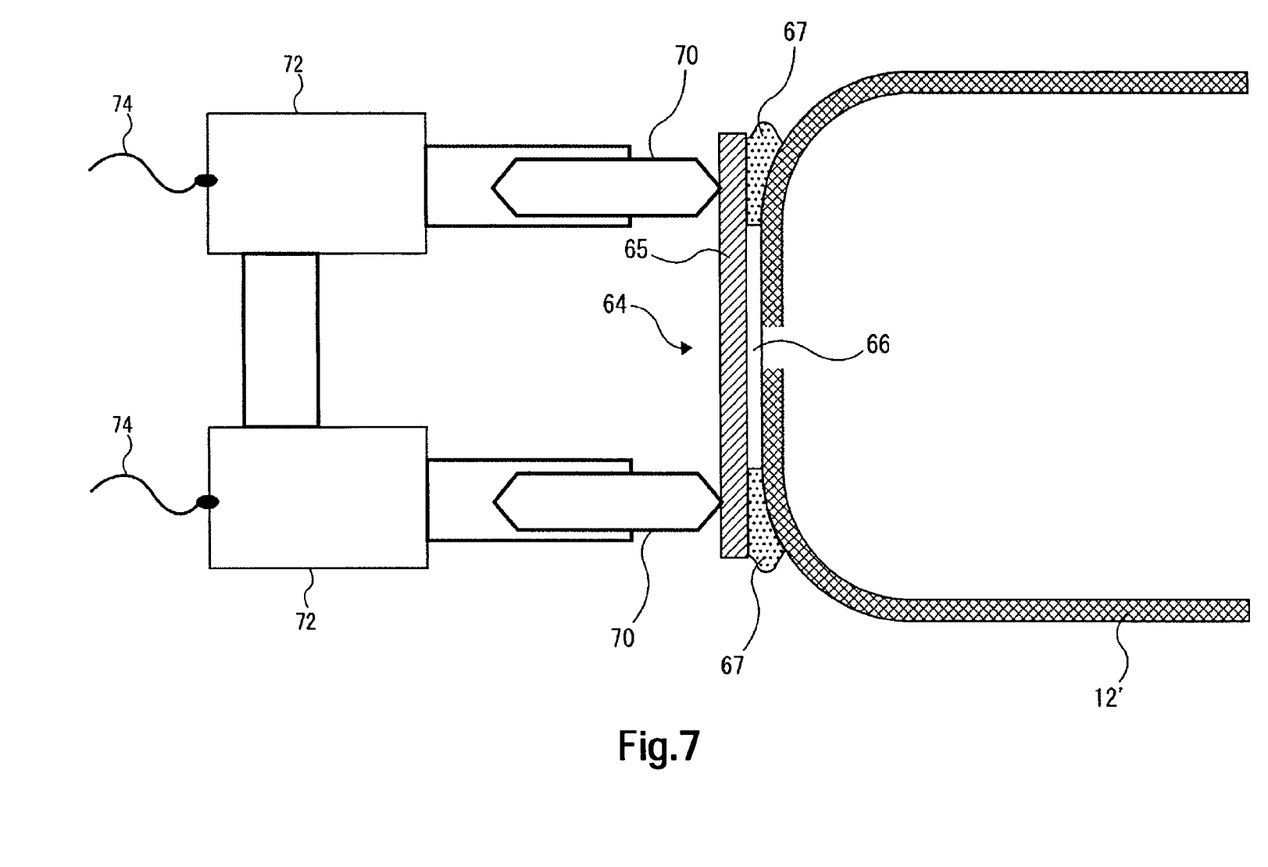
FIG. 7 is a view for explaining a method of soldering the belt-shape seal member on a side surface of the base and the cover.

A method of soldering the belt-shape seal 65 at the side surface of the base 12' and the cover 50' will be explained with reference to FIG. 7. The heating roller 70 is pressed on a portion at which the solder 67 is coated or printed, in the belt-shape seal member 64 affixed to the surface side of the base 12' and the cover 50' by the adhesive tape 66, and is made to circle around the side surface of the casing while being rotated. The heating roller 70 is supported by a rotation support member 72, which generates heat by electric current supplied through the lead wire 74 and melts the solder 67 to solder the belt-shape seal 65 on the side surface of the base 12' and the cover 50' to seal the casing formed by the base 12' and the cover 50' completely.

In the above second embodiment, the cover can be temporarily joined to the base by the adhesive such as the adhesive tape without taking the double cover structure. In addition, the base and the cover can be joined together by the solder provided at the belt-shape seal without heating the base sidewall partially, and without heightening and widening the base sidewall. Therefore, sealing performance of the joint between the base and the cover can be secured.

According to the helium completely sealed in the embodiments, rapid and accurate positioning control, low power consumption and quietness can be realized. When the low power consumption is not considered, rotation of the disk or driving of the head gimbal assembly at higher speed can be realized and the performance of the drive can be improved.

In addition, according to the casing which is completely sealed by the embodiments, effect on the HDA by air-pressure variations and humidity variations can be eliminated, as a result, oxidation deterioration of motor oil and the like in the HDA can be prevented.

What is claimed is:

1. A magnetic disk drive which is a sealed magnetic disk drive including a base in which a disk, a spindle motor rotating and driving the disk, a head recording and reproducing information on the disk and an actuator assembly for moving the head in a radius direction on the disk, and a cover to be joined to the base, and low-density gas is sealed in a space between the base and the cover which are joined, wherein a sidewall of the base includes a flange inside, and the cover comprises a metal plate, an adhesive having a surface wider than the metal plate, which adheres to an upper surface of the metal surface, a seal member having a surface wider than the adhesive, which adheres to an upper surface of the adhesive and a solder coated or printed at an outer periphery of the seal member; and wherein the metal plate is pressed to the flange and the outer periphery of the seal member is joined to an upper surface of the sidewall of the base by the solder at the outside of the adhesive by the adhesive of the cover being affixed to the upper surface of the sidewall of the base.

2. The magnetic disk drive according to claim 1,
wherein the metal plate is pressed on the flange through a gasket.

3. The magnetic disk drive according to claim 1,
wherein the low-density gas is helium.

4. A magnetic disk drive which is a sealed magnetic disk drive including a base in which a disk, a spindle motor rotating and driving the disk, a head recording and reproducing information on the disk and an actuator assembly for moving the head in a radius direction on the disk and which has a sidewall, and a cover to be joined to the base and having a sidewall, and low-density gas is sealed in a space between the sidewalls of the base and cover which are joined,
wherein a belt-shape seal member including a belt-shape seal, an adhesive adhering to the belt-shape seal and a solder coated or printed on the belt-shape seal at a portion outside the adhesive is affixed to all around a side surface of a casing by the adhesive and joined by the solder.

5. The magnetic disk drive according to claim 4,
wherein the adhesive is a adhesive tape.

6. The magnetic disk drive according to claim 4,
wherein the low-density gas is helium.

7. A method of manufacturing a magnetic disk drive, comprising the steps of:
mounting a head disk assembly having a disk, a spindle motor rotating and driving the disk, a head recording and reproducing information on the disk and an actuator assembly for moving the head in a radius direction on the disk, in a base including a sidewall in which a flange is formed inside and a collar-shaped protrusion is formed at an outside upper portion thereof;
preparing a cover including a metal plate, an adhesive having a surface wider than the metal plate, which adheres to an upper surface of the metal plate, a seal member having a surface wider than the adhesive, which adheres to the upper surface of the adhesive and a solder coated or printed at an outer periphery of the seal member;
pressing an outer periphery of the metal plate on a flange and forming a sealed casing by affixing the adhesive of the cover to the upper surface of the sidewall of the base;
sealing low-density gas into the sealed casing and inspecting the head disk assembly; and
melting the solder and joining the seal member to a collar-shaped protrusion of the base after the inspection is finished.

8. The method of manufacturing the magnetic disk drive according to claim 7,
wherein the outer periphery of the metal plate is pressed on the flange through a gasket.

9. The method of manufacturing the magnetic disk drive according to claim 7,
wherein the step of joining the seal member to a collar-shaped protrusion of the base by the solder includes a step of pressing a heating roller on a lower surface of the collar-shaped protrusion and an upper surface of the seal member so as to sandwich the solder, and the heating roller is made to circle around the casing.

10. A method of manufacturing a magnetic disk drive, comprising the steps of:
mounting a head disk assembly having a disk, a spindle motor rotating and driving the disk, a head recording and reproducing information on the disk and an actuator assembly for moving the head in a radius direction on the disk, in a base having a sidewall;
preparing a belt-shape seal member including a belt-shape seal, an adhesive adhering to the belt-shape seal and a solder coated or printed at a portion outside the adhesive of the belt-shape seal;
forming a casing by overlapping the sidewall of the base on a sidewall of a cover;
affixing the adhesive of the belt-shape seal member to all around of a side surface of the casing to be sealed,
sealing low-density gas into the sealed casing and inspecting the head disk assembly, and
melting the solder and joining the belt-shape seal to the side surface of the casing by the solder after the inspection.

11. The method of manufacturing the magnetic disk drive according to claim 10,
wherein the adhesive is an adhesive tape.

12. The method of manufacturing the magnetic disk drive according to claim 10,
wherein the step of joining the belt-shape seal to the side surface of the casing by the solder includes a step of pressing a heating roller on a portion in which the solder of the belt-shape seal is coated or printed, and the heating roller is made to circle around the casing.

* * * * *